United States Patent [19]
Fünfschilling et al.

[11] Patent Number: 6,046,789
[45] Date of Patent: Apr. 4, 2000

[54] BISTABLE FERROELECTRIC LIQUID CRYSTAL CELL

[75] Inventors: Jürg Fünfschilling, Basel; Martin Schadt, Seltisberg, both of Switzerland

[73] Assignee: Rolic AG, Zug, Switzerland

[21] Appl. No.: 08/971,176

[22] Filed: Nov. 17, 1997

[30] Foreign Application Priority Data

Nov. 21, 1996 [CH] Switzerland ............................. 2873/96
Feb. 11, 1997 [CH] Switzerland ............................. 0294/97

[51] Int. Cl.$^7$ ........................................................ G02F 1/13
[52] U.S. Cl. .......................................... 349/172; 349/183
[58] Field of Search ..................................... 349/172, 183

[56] References Cited

U.S. PATENT DOCUMENTS

| | | |
|---|---|---|
| 4,941,736 | 7/1990 | Taniguchi et al. . |
| 5,327,273 | 7/1994 | Beresnev et al. ..................... 349/172 |
| 5,434,685 | 7/1995 | Pirs et al. ............................... 349/183 |

FOREIGN PATENT DOCUMENTS

| | | |
|---|---|---|
| 0241177 | 10/1987 | European Pat. Off. . |
| 0309774 | 4/1989 | European Pat. Off. . |
| 0404081 | 12/1990 | European Pat. Off. . |
| 0405346 | 1/1991 | European Pat. Off. . |
| 9502651 | 9/1996 | France . |
| 3630012 | 4/1987 | Germany . |
| 4334460 | 4/1995 | Germany . |

OTHER PUBLICATIONS

Shao, R.; Zhuang, Z.; Clark, N.; Are Short–Pitch Bistable Ferroelectric Liquid Crystal Cells Surface Stabilized?, Liquid Crystal, 4, No. 4, 1079–1086 (1993).

Fünfschilling, J.; Schadt, M.; New Short–Pitch Bistable Ferroelectric (SBF) Liquid Crystal Displays, Japanese Journal of Applied Physics, 30, No. 4, 741–746 (Apr. 1991).

Fünfschilling, J.; Schadt, M.; Fast Responding and Highly Multiplexible Distorted Helix ferroelectric Lquid–Crystal Displays, Journal of Applied Physics, 66, No. 8, 3877–3882 (1989).

*Primary Examiner*—James A. Dudek
*Attorney, Agent, or Firm*—Finnegan, Henderson, Farabow, Garrett & Dunner, L.L.P.

[57] ABSTRACT

Known liquid crystal cells have a nematic liquid crystal configuration and, in accordance with this configuration, are referred to as TN or STN cells. It is true that such cells are adequate for many applications. However, their image quality is dependent to a very great extent on the user's angle of view. Furthermore, TN and STN cells require a continuously applied signal voltage if it is intended to display or store information on one. Bistable liquid crystal cells having a ferroelectric, chiral smectic liquid crystal layer do not have these disadvantages of nematic display cells. However, the commercial production of such bistable display cells has scarcely become established to date. This is in particular because they are not very suitable for reliably storing information or do not permit absolutely equivalent switching between the two bistable positions of the director. The invention now proposes a novel, bistable liquid crystal cell which avoids precisely these disadvantages. Starting from the SBFLC display cell disclosed in EP-A 0 405 346, the display cell according to the invention is distinguished in that its liquid crystal layer contains polymerized molecules and is formed, by treatment with light and an alternating electric field, in such a way that it has two equivalent, bistable switching states.

16 Claims, 2 Drawing Sheets

BISTABLE FERROELECTRIC LIQUID CRYSTAL CELL

BACKGROUND OF THE INVENTION

1. Field of the invention

The invention relates to a liquid crystal cell—also referred to below as display cell—having a ferro-electric, chiral smectic liquid crystal layer.

Known liquid crystal cells have a nematic liquid crystal configuration and, in accordance with this configuration, are referred to as TN or STN cells. Here, TN is Twisted Nematic and STN is Super Twisted Nematic. Such cells are adequate for many applications. However, their image quality is dependent to a very great extent on the user's angle of view. Furthermore, TN and STN cells require a continuously applied signal voltage if they are to be used for displaying or storing information. This means that the cells are not made for storage and/or representation of data without an energy source. An example of such an application would be a bank or credit card which, without an integrated battery, can store the account balance transferred by a write and read device to the card.

Liquid crystal cells having a ferroelectric, chiral smectic liquid crystal layer belong to a different cell type. Cells of this type have in fact a refractive liquid crystal layer which is also referred to below as an $S_c^*$ layer and optionally forms a helical configuration and which can be influenced or deformed by the action of an electric field so that its optical anisotropy changes.

Known ferroelectric liquid crystal cells have a pair of transparent plates which together enclose the $S_c^*$ layer and are each provided with a surface structure orienting the molecules of the $S_c^*$ layer, provided with electrodes for generating an electric field and each provided with a polarizer. Here, the surface structures facing the $S_c^*$ layer have an orienting effect on the adjacent liquid crystal molecules, as will be described in more detail below. The smectic layers or planes are perpendicular to the plates in ferroelectric liquid crystal cells. In the literature, such a configuration is occasionally also referred to as the so-called bookshelf structure.

The liquid crystals which can be used for ferroelectric display cells consist of a mixture of different chemical compounds. These include so-called dopants, which impart the chiral character to the mixture and are responsible for the ferroelectricity. A chiral smectic liquid crystal mixture is distinguished in particular by the fact that the molecules belonging to a smectic layer and arranged essentially parallel to one another are arranged not perpendicular to the smectic plane but at a smectic tilt angle $\theta$ relative to the plane normal. The chirality of the $S_c^*$ layer results in the axes of the liquid crystal molecules being rotated relative to one another from layer to layer, resulting in the formation of a helix having the pitch p. If such a helix structure is undesired, it must be suppressed through the effect of the border or modification of the bookshelf structure.

In the rest state, i.e. without an applied electric field, the ferroelectric display cell exhibits a certain light transmittance. If a voltage is applied to the electrodes, torques act on the individual smectic layers. These torques result in a reorientation of the molecules and hence a reorientation of the individual smectic layers, leading to rotation of the optical axis. The rotation of the optical axis as a function of the applied voltage can be determined in practice by measuring the switching angle $\alpha$.

However, chiral smectic liquid crystal mixtures also have other properties. Thus, they exhibit spontaneous polarization $P_s$, i.e. an inherent, spontaneous orientation of the molecular dipole moments. This means that an electric field applied to the display cells shows a strong interaction with this spontaneous polarization, permitting a substantial reduction of the switching times known for TN and STN cells. A further property of tilted smectic phases is evident in the case of the bookshelf structure, in which the smectic planes —as already mentioned—are perpendicular to the display surface. If the glass surface is treated here in such a way that molecules of the smectic layers are oriented parallel to the border, there are evidently two possibilities for tilting the molecules relative to the plane normals; namely either forward or backward. The two positions make the same angle with the normals to the $S_c$ planes and are thus compatible with the $S_c$ structure. These two configurations or states are the basis of the bistability of the $S_c$ liquid crystals, i.e. the basis for the formation of bistable ferroelectric liquid crystal cells.

Ferroelectric bistable liquid crystal cells do not have the abovementioned disadvantages of nematic displays. Thus, they have little dependency on the viewing angle and can be disconnected from the energy source as soon as the information has been recorded.

In bistable liquid crystal cells, the ferroelectricity of the $S_c^*$ layer can be switched back and forth between the two configurations or states. At the same time, the spontaneously oriented dipole moments of the chiral dopants produce spontaneous polarization $P_s$, which in turn reacts strongly to an applied electric field. The dopants are thus responsible for the short switching times of bistable cells. It is known that the formation of a helix in a form as occurs, for example, in a DHF cell (here, DHF is Deformed Helix Ferroelectric) is undesired for a bistable liquid crystal configuration. Thus, a limit is imposed on the magnitude of the spontaneous polarization $P_s$. In fact, the chiral molecules contained in the mixture not only produce spontaneous polarization but also promote the tendency to rotation of the $S_c$ structure, which is disadvantageous for a bistable liquid crystal configuration.

In those bistable display cells which are based on the so-called Surface Stabilized Ferroelectric Liquid Crystal (SSFLC) effect of Lagerwall and Clark (Appl. Phys. Lett. 38, 899, 1980), the doping must therefore be chosen to be so low that the interaction of the molecules with the surface is stronger than the effect of the rotating power of the dopants, suppressing or inhibiting the formation of the helix. In practice, this means that the pitch of the helix must be substantially greater than the layer thickness d of the liquid crystal layer.

The relatively weak stabilization of the structure by surface forces and the partial compensation of these forces by the rotating power of the dopants means that bistable switching can be effected with little energy, but the state thus achieved is very labile. Thus, even relatively small electrical or mechanical interferences can "flip" the state, i.e. cause switching back and forth between the two bistable configurations. SSFLC display cells are therefore not very suitable for safe long-term storage.

2. Discussion of the Prior Art

The so-called Short-pitch Bistable Ferroelectric display cell (SBFLC) offers a solution to this problem. In this cell, the liquid crystal layer is shaped by electric pulses so that a zig-zag modulation of the smectic layers is produced, suppressing the formation of a helix. Consequently, this cell reacts to a substantially smaller extent to vibrations than the known SSFCL cells. A display cell of this type is disclosed, for example, in EP-A 0 405 346.

Both the SSFLC and the SBFLC display cells have a further serious disadvantage. In the cells, the information is burnt in. If in fact the cell remains in the same state for a long time, ionic impurities in the form of charge clouds are produced close to the contacts— due to the electric field of the spontaneous polarization. These three-dimensional charges and possibly additional influenced surface charges change the corresponding working point of the cell for further switching. Ghost images or even loss of bistability are a consequence. It has now been found that these three-dimensional charge effects can be reduced or made less critical if conductive orientation layers are used and the poorly conducting or even insulating layers usual in TN and STN display cells are dispensed with. However, the liquid crystal then has a low-resistance connection to the two contacts, dramatically increasing the danger of short-circuits by dust particles, etc.

Another possibility for influencing the helix or director structure of the $S_c^*$ layer is the admixture of polymerizable molecules. The idea here is to stabilize or freeze the director structure in an optimal configuration by a polymerization process in the forming or production of the liquid crystal cell. This is achieved by mixing with the liquid crystal mixture a small percentage of polymerizable molecules which in turn have at least one reaction center and initiate a polymerization reaction on exposure to UV light. This polymerization results in the formation of long molecular filaments which wind up into a tight coil and optionally also undergo crosslinking (which results in a network) and thus freezes the director structure present at the beginning of the polymerization reaction. This process has already been described in U.S. Pat. No. 5,434,685. However, the technique described in this prior publication is limited to SSFCL display cells, i.e. to liquid crystal mixtures having a long pitch p. In the liquid crystal cells disclosed in U.S. Pat. No. 5,434,685, moreover, one of the two stable states—namely that in which the liquid crystal mixture is polymerized—will always be more stable than the other, which, during operation of a cell formed in this manner, results in an undesired asymmetry of the required actuating voltages and may even result in the loss of bistability. In the liquid crystal cells disclosed in U.S. Pat. No. 5,434,685, the polymerization can finally also trigger a phase separation, i.e. the liquid crystal is in this case precipitated in the form of small droplets. The display cells described by J. W. Doane, D. K. Yang and L. C. Chien in Conf. Reports IDRC, SID, page 175 (1991) are examples of this.

SUMMARY OF THE INVENTION

Starting from EP-A 0 405 346, it is now the object of the invention to provide a bistable liquid crystal cell which has the essential advantages of bistable display cells, namely little dependence on the angle of view, the short switching times and the possibility of storing data without an energy source, and moreover does not have the disadvantages of the abovementioned bistable SSFCL and SBFCL display cells.

This object is achieved, according to the invention, by a bistable liquid crystal cell having a ferroelectric, chiral smectic, birefringent liquid crystal layer and polarizer means, wherein the cell having a pair of parallel plates which enclose the liquid crystal layer and each of which is provided with a surface structure orienting the molecules of the liquid crystal layer and with an electrode for generating an electric field, the liquid crystal layer having a layer thickness d, a spontaneous polarization $P_s > 50$ nC/cm$^2$ and a saturated switching angle $\alpha > 45°$, the liquid crystal layer (21) contains polymerized molecules and the layer thickness d is greater than the helix pitch p of the unpolymerized liquid crystal layer in the cell-free state.

The invention furthermore relates to a process for the production of a liquid crystal cell according to the invention and to a display means and a card containing such a liquid crystal cell.

It was surprisingly found that, with a suitable choice of parameters and suitable liquid crystal composition, the use of polymer-forming molecules in SBFCL display cells has much greater advantages than were expected.

It was also found that a display cell of the SBFCL type which is formed with a liquid crystal mixture containing polymer-forming molecules can be formed into a bistable liquid crystal cell having two equivalent states when, during the polymerization process, the cell is illuminated with equal intensity from both sides and at the same time is switched back and forth between the two saturated states by means of an AC voltage. In this case, saturation means that a further increase in the AC voltage does not markedly change either the angle of rotation of the refractive index ellipsoid or the magnitude of the birefringence Δn. In this case, the symmetrical bistability is therefore an indication that the conditions of two-sided illumination and symmetrical switching were complied with during the polymerization. If in fact the cell is not illuminated equally from both sides, the $S_c^*$ layer is monostable or has substantially different switching thresholds for positive and negative voltages, which is harmful for the operation of the display. If symmetrical switching is absent, the switching state which is more frequently assumed during the polymerization will be preferred. This leads to an asymmetrical or possibly monostable liquid crystal cell of the type stated in the introduction.

Particularly preferred embodiments of the liquid crystal cells according to the invention have a resistivity ρ of at most $2 \cdot 10^9$ Ωm, preferably at most $10^9$ Ωm, for example about $4 \cdot 10^8$ Ωm, at room temperature. Thus, it was in fact found that bistable liquid crystal cells having a resistivity ρ of $> 2 \cdot 10^9$ Ωm have substantially poorer contrast than those having a lower resistivity.

The measurement of the ohmic resistance of a ferroelectric liquid crystal cell (or of the liquid crystal mixture contained therein) is made more difficult by the magnitude of the spontaneous polarization. For the present case, however, it can be calculated from the current-voltage characteristic typical of each liquid crystal cell. Such a current-voltage characteristic is shown in the following graph. The characteristic shown in this graph and typical of a preferred liquid crystal cell according to the invention was recorded with a 10 Hz/20 V delta voltage saturating the spontaneous polarization. The ohmic resistance R=13 MΩ can be determined from the differences ΔU and ΔI of the voltage and current values measured at the deflection points and—when the cell size is taken into account—the resistivity $\rho = 4 \cdot 10^8$ Ωm can be determined from said resistance R.

The resistivity of a liquid crystal mixture is essentially dependent on the component composition and, if it is not too high, can be readily reduced by suitable doping, for example with tetrabutylammonium iodide.

It should also be mentioned here that the use of liquid crystal mixtures having relatively low ρ values also facilitates the industrial production of the corresponding liquid crystal cells. Thus, mixtures having relatively high ρ values are required, for example, for the so-called "field effect displays", such as, for example, for the TN and STN cells, making the production of such cells even more difficult.

The liquid crystal cell according to the invention is distinguished by a number of advantages.

Thus, it permits absolutely equivalent switching between two stable positions of the director.

A further advantage of the cell according to the invention is increased stability of the two bistable liquid crystal configurations. Thus, these configurations or orientations (but not the recorded information) are retained even when the liquid crystal cell is heated above the clearing point of the liquid crystal mixture and then cooled again. The orientation formed on cooling is in fact the same as that prior to heating. This property therefore enormously increases the storage temperature range of the liquid crystal cell according to the invention.

A further advantage of the invention is the possibility of combining large spontaneous polarization (i.e. rapid switching rates) with the use of insulating contacts. Thus, it is in fact possible to produce bistable display cells having relatively thick, insulating orientation layers. Such insulation layers reduce the effect of local short-circuits, which is particularly important with the small cell distances of ferroelectric displays.

Owing to the high mechanical stability and the insulating contacts, the liquid crystal cell according to the invention is particularly suitable for applications in which it is subjected to high mechanical and electrical loads. These include, for example, extremely light and optionally flexible display means which are produced from thin plastic sheets. Thus, liquid crystal cells according to the invention can readily be integrated into credit cards and the like. Such a card can then store absolutely reliably and over a long time the information recorded by a write and read device and can do so without an integrated energy source.

BRIEF DESCRIPTION OF THE DRAWINGS

The invention is described in more detail below with reference to the attached drawings.

DESCRIPTION OF THE PREFERRED EMBODIMENTS

Figure 1:
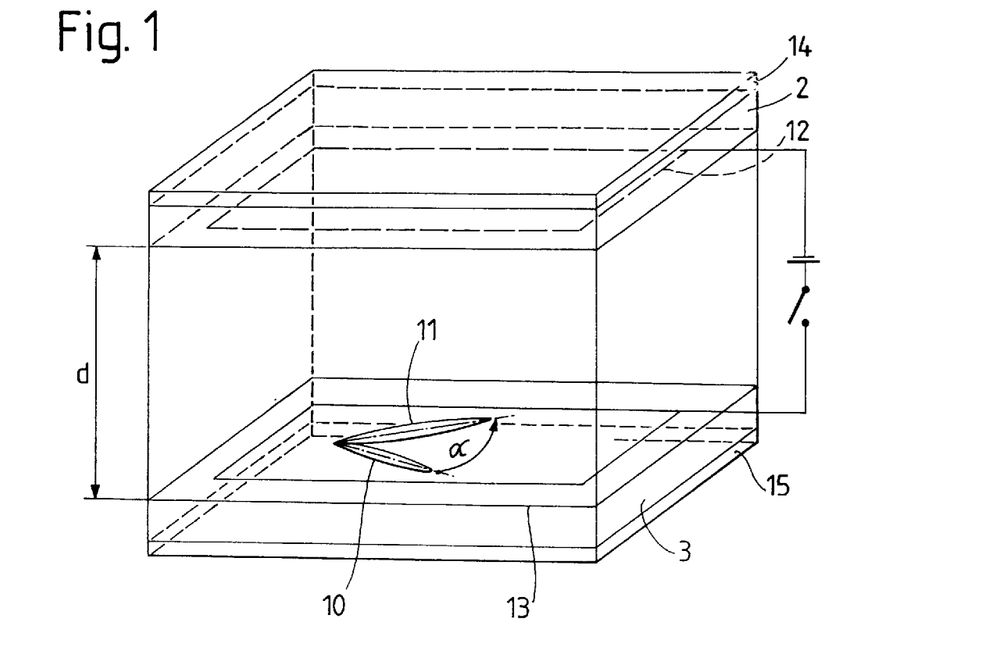
FIG. 1 shows a perspective view of a section of a bistable liquid crystal cell.

The optical system of bistable, ferroelectric liquid crystal cells is shown in simplified form in FIG. 1. The smectic layers of the liquid crystal layer are in this case perpendicular to the plates 2 and 3—as already mentioned at the outset. Furthermore, the molecules of each layer which are arranged parallel to one another are inclined relative to the plane normals by the tilt angle θ mentioned at the outset.

Finally, in the plane of the liquid crystal cell, the refraction ellipsoids are shown in the two stable states 10 and 11. If a voltage is applied to the electrodes 12 and 13, an electric field which reorients the molecules is generated in the liquid crystal. In practice, periodic signals or even actuating pulses, which may have opposite polarities both in the known cell and in the cell according to the invention, arrive from the voltage source represented by a symbol. In practice, this means that a sufficiently large electric field switches the refractive index, for example, from position 10 to position 11. An opposite field switches it back again. Thus, once the cell has been excited by an electric field, the director is then—and also in the absence of an applied electric field—in one of the two bistable configurations. These configurations may still relax, i.e. the observed switching angle α of the optical axis between the two stable positions is in general smaller than the value of twice the tilt angle θ expected for an unrelaxed structure.

Voltages smaller than the so-called threshold voltage $U_s$ cannot switch the refractive index. If such a cell is present between two crossed polarizers 14 and 15 with the optical axis of position 10 parallel to one of the two polarizers, the transmittance is minimum, i.e. dark, with the liquid crystal layer in position 10 and maximum, i.e. light, with the liquid crystal layer in position 11. With this liquid crystal cell, it is thus possible to switch back and forth between light and dark. In a certain voltage range, partial switching may also occur, so that gray values are then also possible. The transmittance is maximum when the bistable switching angle denoted by α is 45°. Since this switching angle α is in most cases smaller than twice the smectic tilt angle θ, this tilt angle should be greater than 22.50, for example greater than 25° and preferably greater than 30°. The thickness d of the liquid crystal layer is finally chosen so that the optical pitch difference for green corresponds approximately to half the wavelength of the green light.

Before the production of the liquid crystal cell according to the invention is explained in more detail, the general structure of such a cell will be described in more detail.

Figure 2:
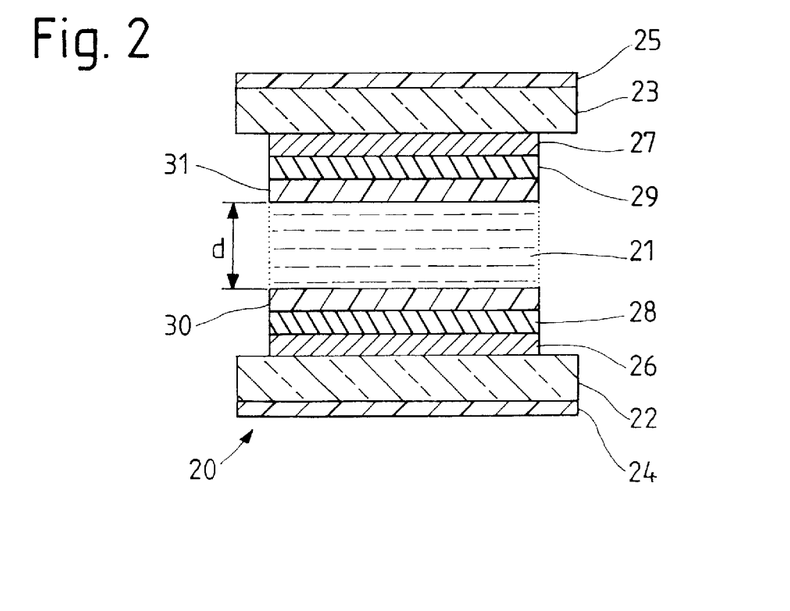
FIG. 2 shows a schematic section through a liquid crystal cell of the type according to the invention and FIG. 3 shows a schematic view of an apparatus for producing display means containing liquid crystal cells and comprising plastic.

The bistable liquid crystal cell shown in FIG. 2 and denoted as a whole by 20 has an $S_c^*$ layer 21 which is arranged between two plates or films 22 or 23 of transparent material which are parallel to one another. Suitable transparent materials for the parallel plates or films 22 and 23 are, for example, glass, acrylic glass or plastic films. The helix pitch p of the liquid crystal layer 21 of the unpolymerized liquid crystal in the cell-free state (i.e. the intrinsic value of p) is chosen so that it is smaller than the layer thickness d.

A polarizer 24 is present on the outside of the lower plate 22 and is preferably connected to the plate 22, for example adhesively bonded to it. Accordingly, a polarizer 25 is coordinated in an analogous manner with the upper plate 23. Alternatively these polarizers may also be arranged inside the cell or may even be provided by the plates 22 and 23 if they consist, for example, of a plastic which contains oriented dichroic dye molecules.

On their surfaces facing the liquid crystal layer 21, the plates 22 and 23 are provided with transparent electrodes 26 and 27 and optionally also with one insulation layer 28 or 29 each.

The carriers each formed from a plate or film, a polarizer, an electrode and an insulation layer are furthermore treated, on their side facing the $S_c^*$ layer, in such a way that they have an orienting effect on the adjacent liquid crystal molecules and thus on the entire liquid crystal layer and hence determine the direction of the director. This treatment consists, for example, in coating with a polymer layer and a subsequent rubbing process. A further orientation method is, for example, the shearing of the liquid crystal layer. Other possibilities comprise oblique incidence vacuum deposition of orienting layers. Such layers are shown in FIG. 2 and denoted by 30 and 31.

In a preferred embodiment of the invention, one of the two polarizers, for example the polarizer 24, is arranged so that its polarization direction is parallel to the optical axis of the first bistable configuration shown in FIG. 1 and denoted by 10 and the polarizer 25 belonging to the other plate 23 is rotated through an angle of 90° relative to the polarizer 24. This orientation of the polarizers 24 and 25 is a preferred embodiment. Other polarizer arrangements are also entirely possible and likewise permit good results to be achieved. They can be readily determined by simple optimization.

The unpolymerized liquid crystal mixture which can be used for the purpose according to the invention is distinguished by a spontaneous polarization Ps>50 nC/cm², a pitch p of <d and a smectic tilt angle θ of >25°. The mixture according to the invention furthermore contains about 1 to 20% by weight of polymerizable molecules, i.e. molecules having at least one reaction center which is formed by an acrylate or epoxide or another structure known to a person skilled in the art.

Furthermore, the mixture may contain initiators which absorb light of a certain wavelength and then initiate the polymerization reaction. However, the mixture may also contain inhibitors which suppress undesired thermal reactions of the polymerization centers.

An example of a liquid crystal mixture according to the invention is shown in the two-part table attached at the end, compounds denoted by A being chiral dopants, the molecule denoted by B being a polymerizable compound, the molecule denoted by C being an inhibitor and the compound denoted by D being a photoinitiator.

The production process for a liquid crystal cell according to the invention is to be explained in more detail below.

For the production of the liquid crystal cell according to the invention, the ferroelectric liquid crystal mixture in the uncrosslinked state is filled into a prepared cell having a cell thickness d of about 2 μm. This can be carried out in a known manner by capillary action, at a temperature of about 90° C. If the orientation layers of the prepared cell are not sufficient for achieving the desired orienting effect over the entire thickness of the cell, this effect can be additionally improved by applying an AC or DC voltage. This can be achieved, for example, by means of a square-wave voltage of ±10 V/1 kHz, which is applied to the cell for about 5 minutes during the subsequent cooling process. Once the liquid crystal mixture has been oriented with the desired quality between the two plates, the polymerization is initiated by light, for which purpose the two sides of the cell are uniformly illuminated, for example for 15 minutes, by means of a mercury lamp (having approximately the spectrum and the intensity of daylight). During this illumination phase, a square-wave voltage, in this case a symmetrical square-wave voltage of, for example, ±30 V/100 Hz, is again applied to the cell. This AC voltage which serves for symmetrical switching preferably has an amplitude which is at most 10% smaller than the amplitude of the saturation voltage and a period which is shorter than the time in which about 0.1% of the polymerization reaction takes place.

A liquid crystal cell formed in this manner is bistable and switches with a high contrast of, for example, 20:1 if it is actuated by means of bipolar pulses. The bipolar pulse sequence consists here, for example, of a pulse of 3 ms duration with an amplitude of −15 V followed by a pulse of 3 ms duration with an amplitude of +15 V for one switching process and of the same pulses in the reverse order for the switching back process.

A preferred embodiment of a formed display cell is characterized in that
  the two bistable switching states enclose a switching angle which is at least 7° smaller than the switching angle observed in the case of saturated switching,
  the magnitude of the birefringence Δn of the two bistable states is at least 5% smaller than in the case of the electrically saturated liquid crystal layer and
  the positive and negative threshold voltages $U_s$ differ from one another by not more than 20%.

It should be noted that the bistable states are not simply the fixed switching states. If in fact a high voltage is applied to the display cell, the maximum switching angle and the maximum birefringence are assumed. If a voltage substantially below the switching threshold is now applied, the display cell relaxes to the bistable state which has a smaller switching angle and lower birefringence. This property is characteristic of the display cell according to the invention.

It should also be pointed out here that the liquid crystal cell described above is only one choice from a plurality of possible embodiments of the invention and that the display cell according to the invention can be operated both in transmission and in reflection and can be correspondingly formed.

Of course, the display cell according to the invention may also be formed as a colored display and may be equipped additionally and in a known manner with the means and color filters required for this purpose.

As already mentioned, the liquid crystal cell according to the invention is suitable for integration in, for example, bank and credit cards. Other "plastic cards" which serve for storing information and can therefore also be equipped with such a display cell are passes, such as, for example, identity cards, season tickets and the like.

Finally, another use of a liquid crystal cell according to the invention is in a display means which is intended for displaying data and information and can be used as an indicator board, for example in department stores, railway stations and airports.

Figure 3:
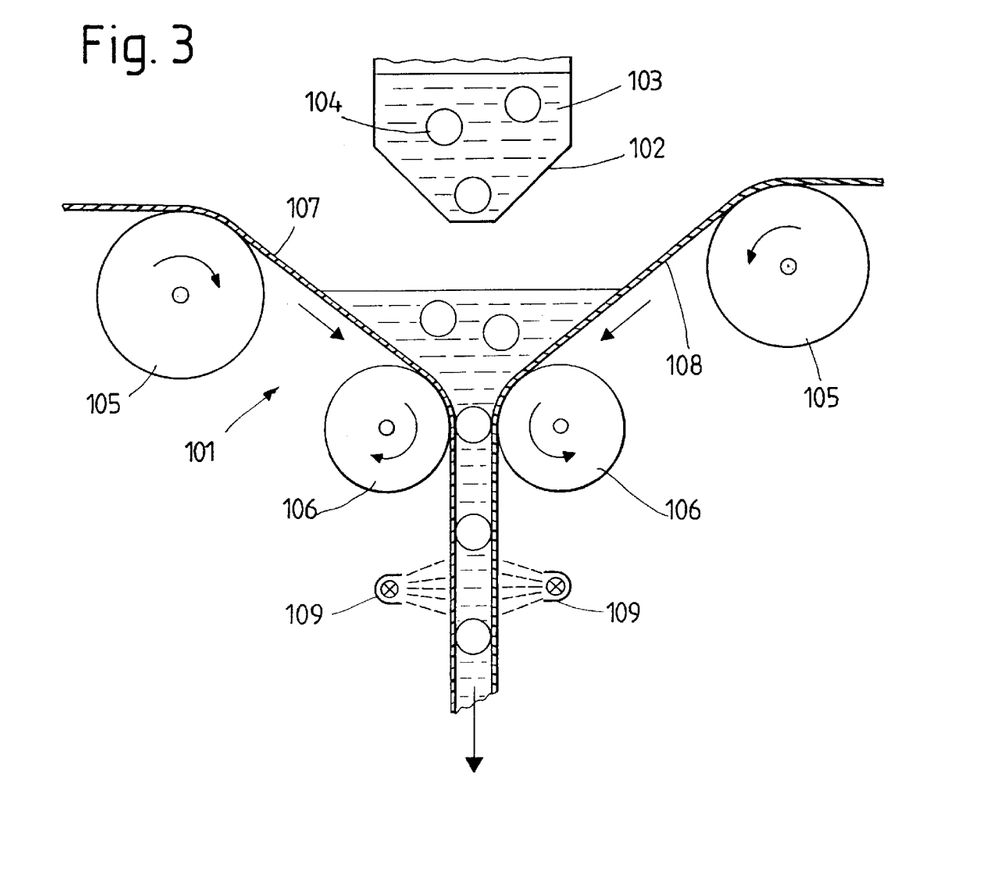

FIG. 3 diagramatically shows a means for producing display cells according to the invention. The means intended for continuous operation has essentially a feed unit 101. This has a reservoir 102 which contains a liquid crystal mixture 103. A substance 104 (e.g. polymer beads) which ensures that a certain layer thickness d is maintained during the production of the display cells is also dissolved in this mixture.

The feed unit 101 also includes heated rollers 105 and 106 which bring two film webs 107 and 108 passed over them into a funnel-like position relative to one another. The liquid crystal mixture 103 can now be poured continuously between the film ribs 107 and 108 which are fed vertically downward over the rollers 106 and which in turn are provided with the layers mentioned. The shear effect of the rolling process of the rollers 106 results in additional orientation of the liquid crystal layer, and the lamps 109 result in the polymerization discussed above. A plurality of display cells of the abovementioned type can then be cut out from the film strip thus produced, provided this film strip is embossed beforehand in sections and welded or laminated at the edge.

| | concentration-g/g | structure |
|---|---|---|
| A | 0.034 |  |
| A | 0.119 |  |
| B | 0.056 |  |
| C | 0.008 |  |
| D | 0.014 |  |
| | 0.195 |  |
| | 0.023 |  |
| | 0.023 |  |
| | 0.011 |  |
| | 0.074 |  |

-continued

| concentration-g/g | structure |
|---|---|
| 0.017 | (pyridine-phenyl-C(=O)O- structure with alkyl chains) |
| 0.017 | (pyridine-phenyl-O- structure with alkyl chains, one with double bond) |
| 0.017 | (pyridine-phenyl-O- structure with alkyl chains, one with double bond) |
| 0,114 | (pyrimidine-phenyl-O- structure with alkyl chains) |
| 0.079 | (difluoro-phenyl-C(=O)O-phenyl-cyclohexyl structure with alkyl chains) |
| 0.079 | (pyrimidine-phenyl-O- structure with alkyl chains) |
| 0.040 | (pyrimidine-phenyl-O- structure with alkyl chains) |
| 0.040 | (pyrimidine-phenyl-O- structure with alkyl chains) |
| 0.040 | (pyrimidine-phenyl-O- structure with alkyl chains) |

What is claimed is:

1. A bistable liquid crystal cell having a ferroelectric, chiral smectic, birefringent liquid crystal layer and polarizer means, the cell having a pair of parallel plates which enclose the liquid crystal layer and each of which is provided with a surface structure orienting the molecules of the liquid crystal layer and with an electrode for generating an electric field, and the liquid crystal layer having a layer thickness d, a spontaneous polarization $P_s > 50$ nC/cm$^2$ and a saturated switching angle $\alpha > 45°$, wherein the liquid crystal layer contains polymerized molecules and wherein the layer thickness d is greater than the helix pitch p of the unpolymerized liquid crystal layer in the cell-free state.

2. A liquid crystal cell as claimed in claim 1, where the voltage may not fall below a threshold voltage $U_s$ for switching between the two stable positions of the director, wherein the magnitudes of the two threshold voltages $U_s$ intended for reaching the two bistable positions differ from one another by not more than 20%.

3. A liquid crystal cell as claimed in claim 1, wherein the cell comprises a resistivity $\rho$ which is at most $2 \cdot 10^9$ $\Omega$m, at room temperature.

4. A liquid crystal cell as claimed in claim 1, the liquid crystal layer being formed by means of light and an alternating electric field for the formation of said cell, and the liquid crystal layer formed in this manner being present in the electrically saturated state when, during the forming of the cell, neither the angle of rotation of the refractive index ellipsoid nor the magnitude of the birefringence $\Delta$n is markedly changed by an increase in the AC voltage, wherein the two bistable switching states in the formed state enclose a switching angle $\alpha$ which is at least 7° smaller than the switching angle $\alpha$ observed in the case of saturated switching, and wherein the magnitude of the birefringence Δn of the two bistable states is at least 5% smaller than in the case of the electrically saturated liquid crystal layer.

5. A liquid crystal cell as claimed in claim 1, which comprises two polarizers arranged perpendicular to one another.

6. A liquid crystal cell as claimed in claim 1, wherein the liquid crystal layer contains 1 to 20% by weight of polymerized compounds.

7. A liquid crystal cell as claimed in claim 1, wherein the saturated switching angle α is greater than 50°.

8. A liquid crystal cell as claimed in claim 1, wherein the two plates alternatively consist of glass or flexible plastic.

9. A process for the production of a liquid crystal cell as claimed in claim 1, wherein a ferroelectric liquid crystal mixture in the unpolymerized state is filled into a prepared cell, wherein this cell is illuminated from both sides with light of equal intensity for the polymerization and wherein a symmetrical AC voltage is applied to the cell during the polymerization process.

10. A process as claimed in claim 9, which comprises using an AC voltage having an amplitude which is at most 10% smaller than the amplitude of the saturation voltage and a period which is shorter than the time in which about 0.1% of the polymerization reaction takes place.

11. A display means containing a liquid crystal cell as claimed in claim 1.

12. A display means as claimed in claim 11, which is a board for displaying data and information.

13. A card containing a liquid crystal cell as claimed in claim 1, the plates of the cell consisting of flexible plastic.

14. A card as claimed in claim 13, which is a bank or credit card or a pass card.

15. A liquid crystal cell as claimed in claim 1, wherein the cell comprises a resistivity p which is at most $10^9$ Ωm, at room temperature.

16. A liquid crystal cell as claimed in claim 1, wherein the saturated switching angle a is greater than 60°.

* * * * *